United States Patent
Yusufi

(10) Patent No.: US 6,562,389 B1
(45) Date of Patent: May 13, 2003

(54) METHOD OF MAKING BREAD FROM DOUGH AND CUTTING MEANS FOR USE THEREWITH

(76) Inventor: Nasier Ahmad Yusufi, Het Dok 41, NL-1021 PT Amsterdam (NL)

( * ) Notice: Subject to any disclaimer, the term of this patent is extended or adjusted under 35 U.S.C. 154(b) by 0 days.

(21) Appl. No.: 09/125,912
(22) PCT Filed: Feb. 26, 1997
(86) PCT No.: PCT/NL97/00087
§ 371 (c)(1),
(2), (4) Date: Aug. 27, 1998
(87) PCT Pub. No.: WO97/31539
PCT Pub. Date: Sep. 4, 1997

(30) Foreign Application Priority Data

Feb. 27, 1996 (NL) .............................................. 1002456

(51) Int. Cl.[7] ................................................. A21D 8/00
(52) U.S. Cl. ....................... 426/523; 426/275; 426/283; 426/503
(58) Field of Search ................................ 426/523, 502, 426/503, 512, 517, 275, 94, 283; 99/450.4, 450.5

(56) References Cited

U.S. PATENT DOCUMENTS

| | | | |
|---|---|---|---|
| 1,797,856 A | * 3/1931 | Doering | 426/94 |
| 2,887,964 A | 5/1959 | Griner | 107/23 |
| 3,083,651 A | * 4/1963 | Cooper | 426/94 |
| 3,880,030 A | 4/1975 | Rosengren | 83/9 |
| 4,276,800 A | 7/1981 | Koppa et al. | 83/863 |
| 4,382,970 A | * 5/1983 | Sorensen | 426/502 |
| 5,045,329 A | * 9/1991 | Goglanian | 426/503 |

FOREIGN PATENT DOCUMENTS

| | | |
|---|---|---|
| DE | 25 36 284 A1 | 2/1977 |
| FR | 1227972 | 8/1960 |
| FR | 2 335 161 | 7/1977 |
| GB | 1 255 513 | 12/1971 |
| NL | 40987 | 1/1937 |
| NL | 255103 | 3/1964 |
| WO | WO 91/03941 | 4/1991 |
| WO | WO 96/39038 | 12/1996 |

* cited by examiner

*Primary Examiner*—George C. Yeung
(74) *Attorney, Agent, or Firm*—Dicke, Billig & Czaja, P.L.L.C.

(57) ABSTRACT

A method of baking bread from dough including the steps of preparing the dough, rolling out the dough into a flat strip in the range of approximately 1–30 mm, cutting the strip of dough into pieces, baking the flat pieces of dough in an oven for a short time (in the range of approximately 2–8 minutes) at a temperature in the range of approximately 250–270° C. and cooling and, if desired, packaging the flat pieces of baked bread. The method of the present invention saves a great deal of time, energy and labor, and results in an attractive product. The invention also includes the resultant bread and a cutting means for use with the method.

17 Claims, 3 Drawing Sheets

METHOD OF MAKING BREAD FROM DOUGH AND CUTTING MEANS FOR USE THEREWITH

The present invention relates to a method of making bread from dough.

In traditional methods of making bread, pieces of kneaded bread dough are placed in baking moulds and these moulds are put into the oven in order to bake the dough into a loaf. The total preparation time is approximately 3 hours. When the leaf is cooled it is suited for sale. For consumption it is necessary to slice the loaf into separate slices or pieces of bread either after baking, when it is sold or just before consumption.

The object of the invention is to provide a method of making bread which results in considerable simplifications and savings.

For this purpose the method according to the invention is characterized by preparing the dough; rolling out the dough into a flat strip; cutting the strip of dough into pieces; baking the flat pieces of dough in an oven; and cooling and, if desired, packaging the flat pieces of baked bread.

These measures lead to a number of advantages. First of all, it results in a considerable saving of energy costs since the pieces of dough only need a short baking time due to their small thickness, for example between 1 and 20 minutes, and preferably between ca. 2 and 8 minutes compared to approximately 50 minutes for traditional loafs (at approximately the same temperature, ca. 270° C.). Due to the small thickness of the pieces of bread it is directly suited for consumption thereby avoiding the necessity of slicing the bread, which results in a considerable saving. The total preparation time may also be reduced substantially, from ca. 3 hours to 30–60 minutes. As the "slices" of bread are baked on all sides it is more difficult for fungus to penetrate into the bread making the bread less perishable, also due to reduced dry out as a result of the protective crust. The operation of kneading the dough, rolling it out into a strip and cutting it into pieces is very well suited for automization, thereby saving on labour and making the remaining work less intensive and strenuous.

Depending on the type of dough and the desired "lightness" of the bread, the bread dough may be rolled out into a strip having a thickness of ca. 1–30 mm and preferably ca. 5–9 mm.

An automized embodiment of the method is one in which the strip of dough is conveyed on a conveyor belt and the pieces are cut by a rolling cutting means. It is favourable therewith if, during the cutting operation, the pieces of dough are provided with weakening lines in order to define a number of sandwiches within a piece of bread. This enables the formation of handy sized flat pieces allowing a number of pieces to be packaged together. The weakening lines allow an easy separation of a sandwich from the piece of bread. The invention also includes such bread.

The invention further includes a cutting means to be used with the method described above, comprising one of more rollers, having transverse and/or circumferential cutting ribs on its surface, and preferably including weakening line ribs positioned intermediate the cutting ribs and being smaller in height than the cutting ribs.

The invention will hereafter be further explained with reference to the drawing showing an embodiment of the invention.

Figure 1:
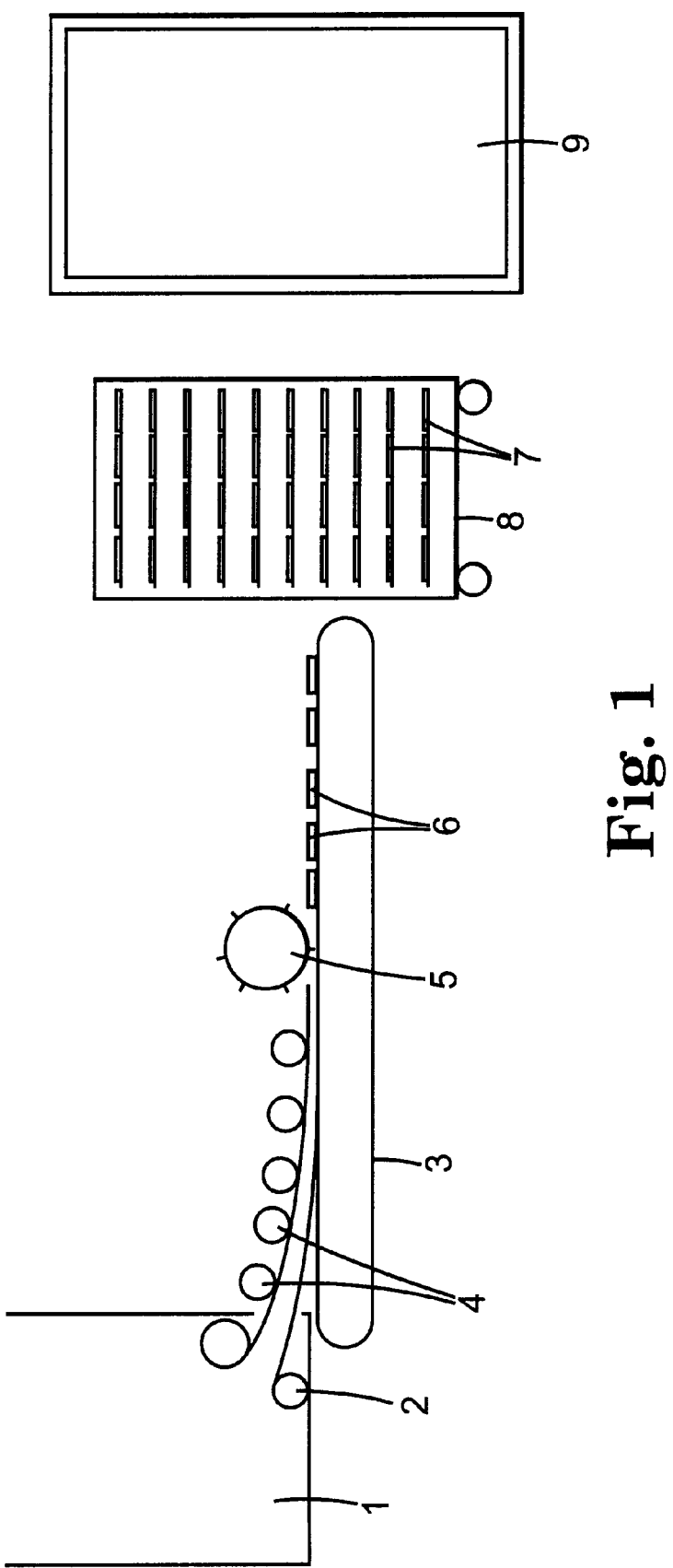
FIG. 1 illustrates very schematically the embodiment of the method of making bread according to the invention.

As mentioned FIG. 1 illustrates the method according to the invention. Shown is a mixing and kneading trough 1 in which the bread dough is prepared. Although it is possible to use a large variety of dough types in the method according to the invention, it is preferred to use the following recipe (numbers are approximately):

100 kg flour (white or brown)
51–53 l of water
15 kg of Exakt powder
2–3% yeast
2% salt For breakfast bread (sweet filling) it is possible to add a quantity of grained cardaman.

The kneaded dough is allowed to rest for preferably 15 minutes (or more), preferably at room temperature, before it is then discharged from the trough 1, in this case through a discharge mechanism 2 which supplies the dough to a conveyor belt 3 including rollers 4. The rollers 4 roll out the dough into a long strip having a thickness of preferably 5–9 mm and a width of for example ca. 45 cm. When the dough is rolled out to the desired thickness, it is passed below a roller shaped cutting means 5 which is driven in synchronization with the conveyor belt 3 and cuts the dough into desired pieces 6. This cutting means 5 will be described more fully later on.

After cutting the dough, the upper side of the pieces maybe provided with a pattern and/or be smeared with for example egg-white (diluted with 30% water) or water containing white flour (150 gr white flour mixed with 1 liter of boiling water) to obtain a nice appearance of the baked bread. If desired, it is also possible to sprinkle seed or grain kernels or flakes on the pieces 6 is desired.

The cut pieces 6 of the dough are collected on smeared baking plates 7, for example by supplying the baking plates 7 on a further conveyor belt below the conveyor belt 3 and depositing the pieces of bread thereon. A large number of baking plates 7 are placed in a cart 8 and several carts 8 may be introduced completely into an oven 9. The pieces of bread 6 are baked in the oven 9 for a short time, preferably 2–8 à 9 minutes (eg. depending on the thickness of the bread) at a temperature of ca. 250–270° C., preferably at ca. 255–265° C. (depending on the atmospheric temperature). The residual moisture content after baking is more than ca. 20% and preferably around 40%. The dough is preferably such that bread is comparetively firm and contains substantially, for example 70%, less air than normal loaf bread. After cooling off, the pieces of bread are ready and may be packaged singly, but preferably as a plurality together. The bread in then ready for sale.

Figure 3:
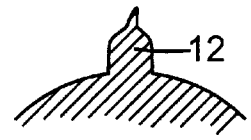
FIG. 3 is an enlarged sectional view along the line III—III in FIG. 2.
Figure 2:
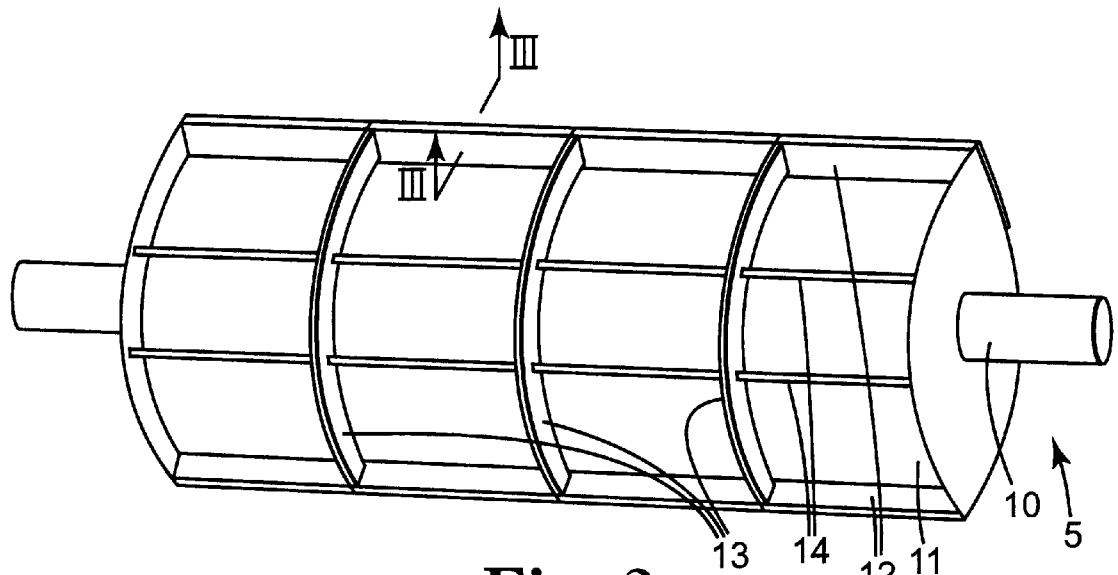
FIG. 2 is an enlarged perspective view of a cutting means used in the method.
Figure 4:
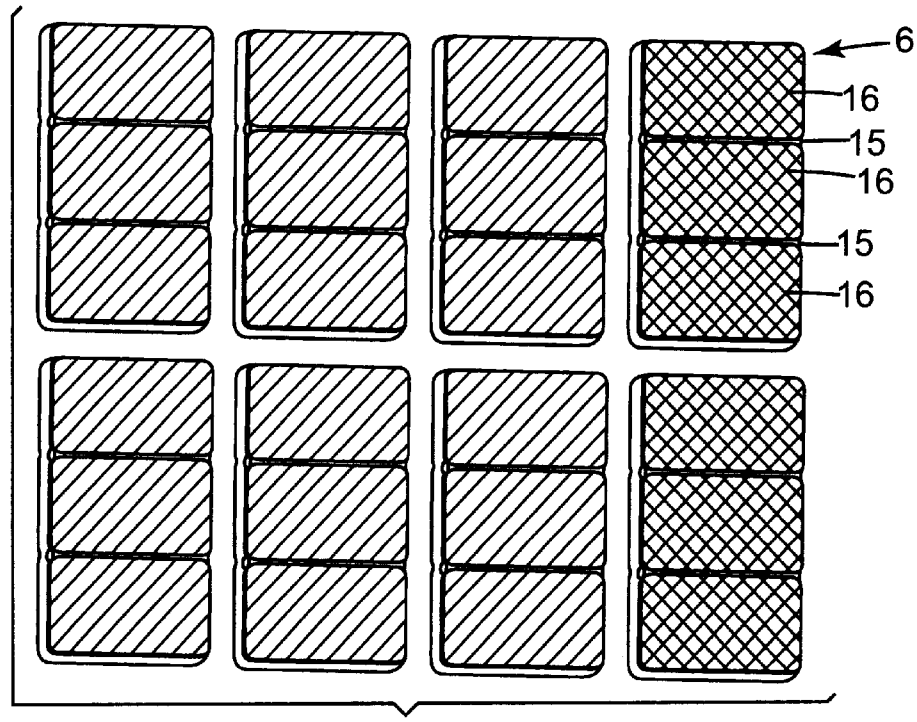
FIG. 4 is a plan view of the pieces of bread (dough) cut with the cutting means of FIG. 2.
Figure 5:
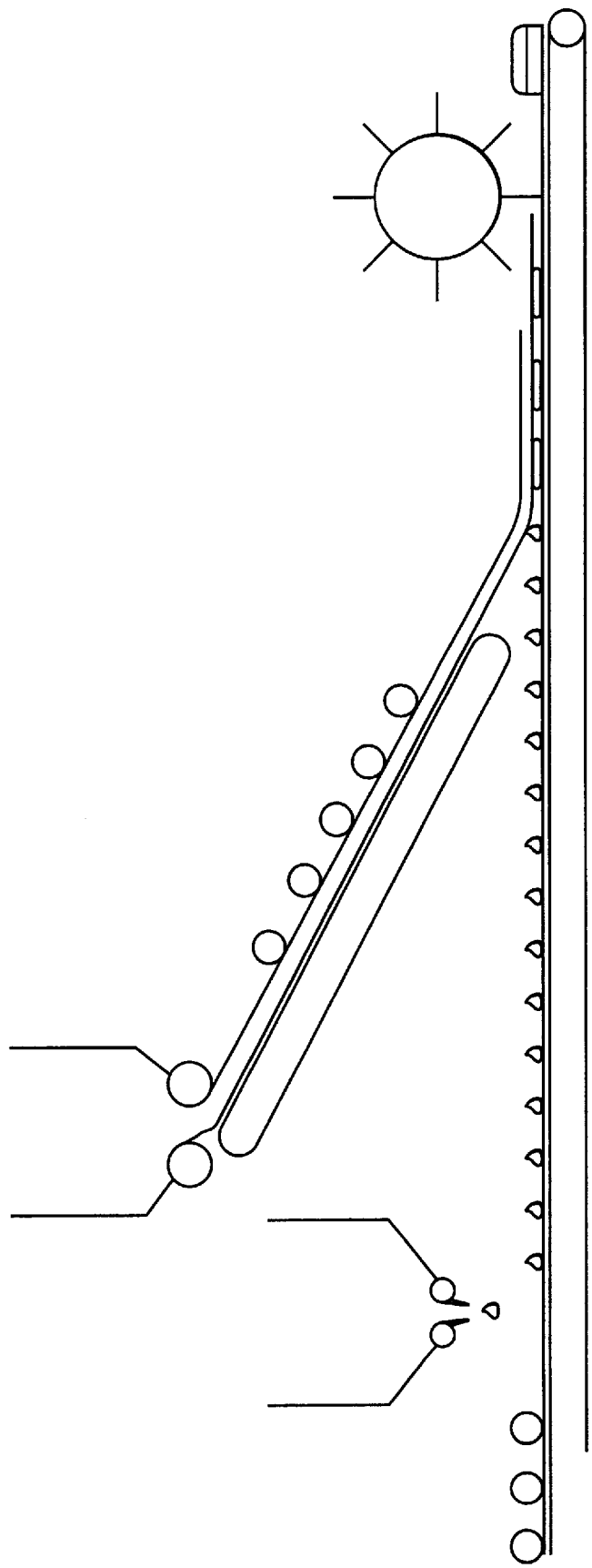
FIG. 5 illustrates schematically an alternative embodiment of the method of making bread according to the invention in which an upper and lower layer of dough are concurrently processed and formed as a sandwich.

FIG. 2–4 show the cutting means 5 and the pieces of bread (dough) formed by cutting. The cutting means comprises a roller 11 rotatable about an axis 10 and having on its surface transverse and circumferential cutting ribs 12, 13, respectively. The transverse section of the cutting ribs 12 are shown in FIG. 3. and the ribs 13 have the same cross section. The height of the ribs 12, 13 form the surface of the roller 11 will minimally correspond substantially with the thickness of the desired pieces of dough. Weakening line ribs 14 are provided between the cutting ribs 12 and 13 and extend to a lesser extent (for example 2–3 mm) from the surface of the roller than the cutting ribs. The weakening line ribs 14 are intended to form weakening lines or depressions 15 in the bread dough pieces 6 which define a number of "slices" of bread 16 within these pieces. Consequently, these slices of bread 16 are pre-formed and interconnected at their sides so that they are easy to separate from a piece of bread in order to be consumed. Each piece of bread may contain for example 2,3,4 or 6 pre-formed slices of bread. The cutting means 5 as shown is able to cut 8 pieces of bread during one revolution, but each other number is conceivable. In the embodiment shown, the pieces of bread 6 contain three rectangular "slices" of ca. 9 by 12 cms. Of course other sizes and shapes, for example also polygonal, round or the like are conceivable. FIG. 4 also shows that the upper side of the pieces of bread may be provided with cut-in stripe or check patterns for decoration purposes. Of course it would also be possible to make the cuts and patterns with two or more cutting means, wherein one cutting means make the longitudinal cuts and the other cutting means the transverse cuts. In this manner it is more easy to adjust, change or remove the knives of a cutting means.

From the foregoing it will be clear that the invention provides a bread making method which result in savings of time, energy (ca. 85%!) and labour, effects a simplification of the remaining work and leads to an attractive product having favourable qualities.

The invention is not restricted to the embodiment shown in the drawing and described herein before by way of example which may be varied in different manners within the scope of the invention. It is for example possible to prepare compound bread having several layers, for example two outer layers of bread and an intermediate layer of filling, such as paste, cheese, sliced cold meat or sweet filling. For this purpose, the filling is placed on a lower layer of dough, whereafter the upper layer is added and the the bread is then baked. The bread in then directly suited for consumption and is very convenient for consumers.

What is claimed is:

1. A method of making a bread product from bread dough, the bread product simulating bread slices from a bread loaf, the method including the steps of:
   preparing the bread dough;
   rolling out the bread dough into a flat strip;
   cutting the strip of dough into flat pieces;
   baking the flat pieces of dough in an oven for a time period in the range of approximately 2–8 minutes at a temperature in the range of approximately 250–270° C. to form flat pieces of bread simulating bread slices from a bread loaf, whereby the pieces of dough do not internally separate during baking; and
   cooling the flat pieces of baked bread.

2. The method of claim 1, wherein the bread dough is rolled out into a strip having a thickness in the range of approximately 1–30 mm.

3. The method of claim 1, wherein the cutting step includes:
   creating weakening lines in the pieces of dough in order to define a number of sandwiches or slices within a piece of bread.

4. The method of claim 1, further including conveying the strip of dough on a conveyor belt and cutting the pieces by a rolling cutting means.

5. The method of claim 1, wherein baking the pieces of dough in an oven includes baking the pieces of dough at a temperature in the range of approximately 255–265° C.

6. The method of claim 1, wherein preparing the bread dough includes kneading the bread dough and allowing the bread dough to rest after kneading for 15 minutes minimum.

7. A method of making a bread product from bread dough, the bread product simulating bread slices from a bread loaf, the method including the steps of:
   preparing the bread dough;
   rolling out the bread dough into a flat strip having a thickness in the range of approximately 5–9 mm;
   cutting the strip of dough into pieces;
   baking the flat pieces of dough in an oven to form flat pieces of baked bread simulating slices from a bread loaf; and
   cooling the flat pieces of baked bread;
   wherein following the cooling step, the flat pieces each contain less air than a bread loaf formed from identical ingredients.

8. A method of making a bread product from bread dough, the bread product simulating bread slices from a bread loaf, the method including the steps of:
   preparing the bread dough;
   rolling out the bread dough into a flat strip having a thickness of approximately 5–9 mm;
   cutting the strip of dough into flat pieces;
   baking the flat pieces of dough in an oven for a time period in the range of approximately 2–8 minutes and at a temperature in the range of approximately 250–270° C. to form flat pieces of baked bread simulating bread slices from a bread loaf, whereby the pieces of dough do not internally separate during baking; and
   cooling the flat pieces of baked bread.

9. A method of making a bread product from bread dough, the bread product simulating bread slices from a bread loaf, the method including the steps of:
   preparing the bread dough;
   rolling out the bread dough into a flat strip;
   cutting the strip of dough into flat pieces;
   providing the flat pieces with weakening lines in order to define a number of sandwiches or slices within a piece of bread;
   baking the flat pieces of dough in an oven to form flat pieces of baked bread simulating bread slices from a bread loaf, whereby the pieces of dough do not internally separate during baking; and
   cooling the flat pieces of baked bread.

10. The method of claim 9, wherein providing weakening lines includes creating a plurality of weakening lines for defining a plurality of slices.

11. The method of claim 1, further including:
    providing an upper side of the dough pieces with a pattern after cutting.

12. The method of claim 1, further including:
    disposing a spread material on the dough pieces.

13. The method of claim 12, further including:
    forming a sandwich with two of the flat pieces of dough such that the spread material is disposed between the two pieces of dough, wherein the pieces of dough and the spread material are subsequently baked concurrently.

14. The method of claim 1, wherein baking the flat pieces of dough does not include generating an internal pressure within each of the pieces of dough.

15. The method of claim 1, wherein cutting the strip of dough includes utilizing an entirety of the flat strip to form the flat pieces.

16. The method of claim 3, wherein a plurality of weakening lines are created in at least one of the pieces of dough to define a multiplicity of slices within the resulting piece of bread.

17. The method of claim 8, wherein following the cooling step, each of the flat pieces contains 70% less air than a bread loaf formed from identical ingredients.

* * * * *